March 24, 1931. L. ROUGERIE 1,797,794
TRAINING DEVICE FOR PILOTS
Filed April 29, 1929
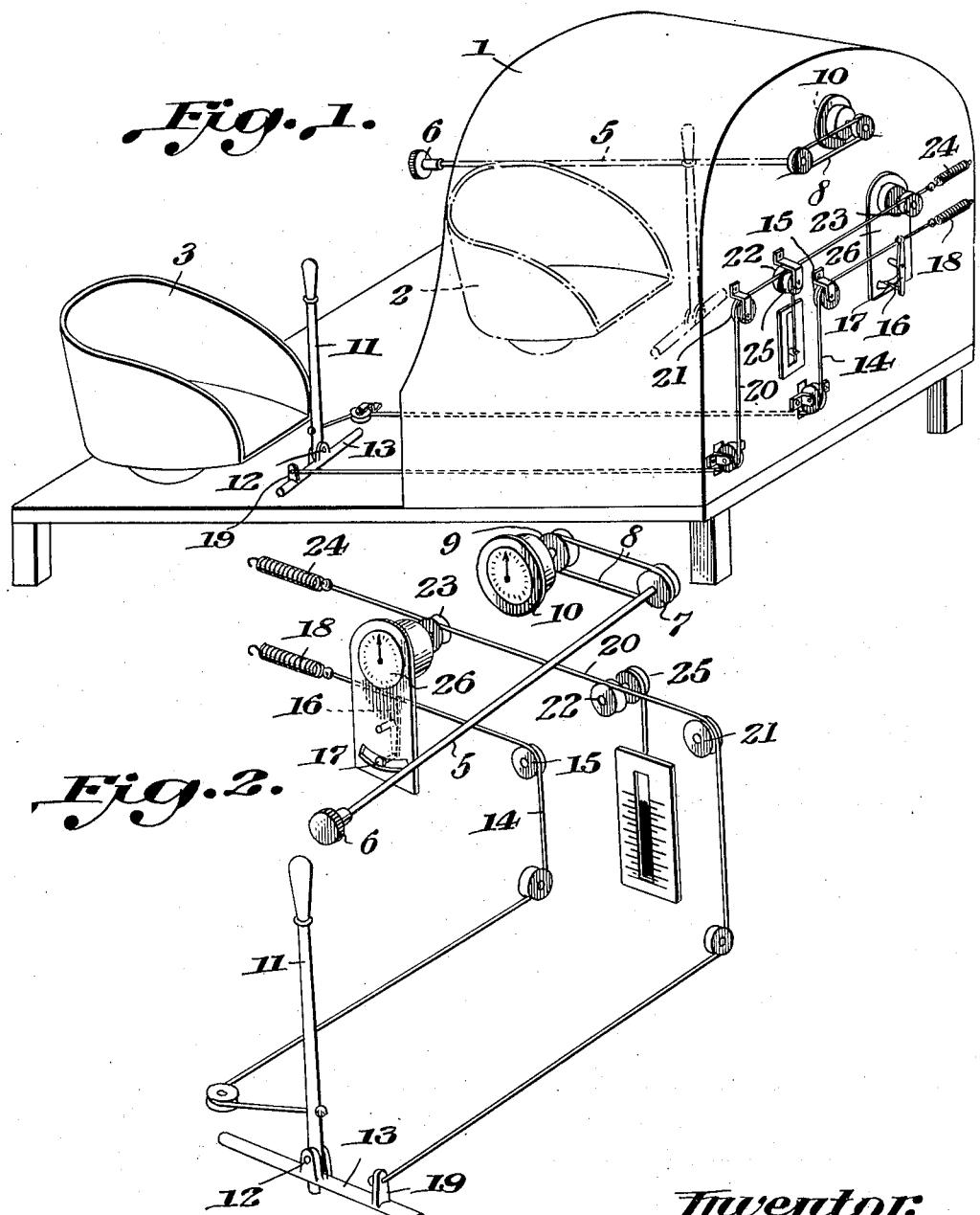

Patented Mar. 24, 1931

1,797,794

UNITED STATES PATENT OFFICE

LUCIEN ROUGERIE, OF VERSAILLES, FRANCE, ASSIGNOR TO ETABLISSEMENTS AERA, OF PARIS, FRANCE, A CORPORATION OF FRANCE

TRAINING DEVICE FOR PILOTS

Application filed April 29, 1929, Serial No. 358,875, and in France June 13, 1928.

The present invention relates to a training bench for pilots, in which the pilot only sees his instrument board, and has within reach of his hand loosely-mounted controlling devices representing those which are ordinarily used. The indications given by the instruments on the board are obtained by an instructor seated behind the student pilot, who observes, judges and corrects the reflexes of the student produced by the observation of the said instruments which manifest themselves by the movements impressed by the student on the controls.

It has been shown by practice that a pilot from whose view the earth is cut off by mist or darkness, cannot rely upon his own sensations in steering. On the contrary, such indications as are given by the instruments on board provide reliable instructions. The chief instruments which are intended to check stability in flight and the keeping of the route are the following:—The anemometric indicator, the turning indicator, and the transversal slope-level, these being generally assembled into one single apparatus known as the flight indicator; and the longitudinal slope level, the altimeter and the compass, to which there may be added other devices such as the tachymeter and the incidence and sliding indicators.

While it is necessary for the pupil to know the exact signification of the various instruments, it is also necessary that he should get accustomed to such reflexes as must be set up in him by the mere sight of these indications.

Such teaching may be practiced on the ground, the teacher manipulating his controls so as to attain certain effects, and the device of the invention enables the student to see similar readings and to manipulate certain fictitious or dummy controls as he would do if in a plane in flight and like indications appeared on the instruments. Correctness of steering is thus acquired visually by the pupil and watch is kept by the instructor.

The invention has accordingly for its object to provide such devices as will allow this instructing and practicing method to be carried into effect.

In the accompanying drawings, Figure 1 is a diagrammatic perspective view given by way of example of an arrangement wherein the fictitious or dummy board instruments, which may be given the appearance of real instruments, are acted upon directly by the control devices.

Fig. 2 is a perspective view of the means for controlling the instruments on the board.

For instance, the structure is arranged in a stationary or a portable cabin 1 which may be built in the form of a cockpit in which there are arranged a seat 2 for the pupil and a seat 3 for the instructor. The instruments are arranged on the end wall, which instruments may be laid out similarly to those of a dash-board.

These instruments may be controlled, for instance as shown in Figure 2, by means of a spindle 5 provided at one end thereof with a knurled knob 6 located within the instructor's reach, and at the other end with a pulley 7. Said pulley drives through the medium of a belt 8 a pulley 9 rigidly connected to the hand or pointer of the instrument 10. Bevel gears connected to rigid spindles might also be used instead of belts.

Such arrangement is particularly but not exclusively applicable to instruments, the hands of which are adapted for wide angular displacement, through nearly one revolution, as in the altimeter, or through an infinite number of revolutions as in the compass.

Another control device may also consist of rods, levers and bell crank levers, which arrangement is particularly but not exclusively applicable to such instruments the hands of which swing only through a small angle, such as the anemometer, the longitudinal slope-level (these devices may or may not be rigidly interconnected), the transversal slope-level and the turning indicator.

Irrespective of their character, the control means for the devices may be arranged in like manner as on board of a flying machine, that is, in the form of a vertical lever constructed to have a transverse motion, or of a hand wheel, and a double arm pedal lever.

For purposes of example, an embodiment of a vertical lever arrangement with cable transmission is shown in Fig. 2. 11 indicates the instructor's vertical control lever or joy stick which is swingable about fulcra 12 and 13. Attached to the joy stick is a wire 14 which is passed over a pulley 15 and which actuates a lever 16 carrying the ball 17 of the transverse slope-level. Said wire is tightened by means of a spring 18. On the other hand, the fulcrum or rock shaft 13 of the vertical lever or joy stick carries a link 19 to which there is secured a wire 20 passed over pulleys 21, 22, and 23, and which is tightened by means of a spring 24. The pulley 22 carries a drum 25 which, through the medium of a small string, causes the vertical movement of a rod painted white at its upper part and red at its lower part, which is guided through a glass tube and has the same appearance as the longitudinal slope-level which it simulates. The pulley 23 is rigidly connected to the hand of the anemometer 26.

The double arm pedal lever is adapted to influence the turning indicator through a similar arrangement, or through an endless wire arrangement mounted on pulleys.

Moreover, inasmuch as some controls, such as that for the anemometer, do not swing the hand around the whole dial but only through a certain angle on either side of the normal flight position, it may be necessary to provide an adjustment device: for instance, on the wire 20 and between pulleys 22 and 23 there may be arranged a pulley (not shown) which simulates a tightening roller. Otherwise, a simple screw-threaded tightener may be used together with any other suitable device (e. g. a dial, a movable hand, etc.).

Moreover, any other remote control and adjustment device (e. g. pneumatic, hydraulic, electrical and like devices) may be used, the resulting structure being by no means a departure from the scope of the invention.

The above is based upon the assumption that only the instructor has any action upon such control means as described. Only such control means as will not interefere with the instruments are available to the pupil.

In arrangements of the character described, the pupil cannot practice when alone, at least when seated at his normal place, and the instructor has to watch the movements of the pupil himself and to act upon his own control means either by returning his hands to their normal positions (when the pupil's action was a correct one) or by increasing the deflection of the same (in the reverse case).

I claim:

1. A training bench for student pilots, comprising a platform, an opaque-walled cabin mounted on said platform, an instrument board at the front end of the cabin, indicating instruments on said board, a seat for the student pilot in said cabin, loosely-mounted dummy controls to be manipulated by the student, a seat for an instructor in rear of the student's seat and arranged so that the instructor may observe the movements of the dummy controls by the student, and means operable by the instructor for manipulating the indicating instruments on the board.

2. A training bench for student pilots, comprising a platform, an opaque-walled cabin mounted on said platform, an instrument board at the front end of the cabin, indicating instruments on said board, a seat for the student pilot in said cabin, loosely-mounted dummy controls to be manipulated by the student, a seat for an instructor in rear of the student's seat and arranged so that the instructor may observe the movements of the dummy controls by the student, a movable controlling member for manipulation by the instructor, a pulley controlled by said member, and a transmission connection between said pulley and one of the instruments on the board.

3. A training bench for student pilots, comprising a platform, an opaque-walled cabin mounted on said platform, an instrument board at the front end of the cabin, indicating instruments on said board, a seat for the student pilot in said cabin, loosely-mounted dummy controls to be manipulated by the student, a seat for an instructor in rear of the student's seat and arranged so that the instructor may observe the movements of the dummy controls by the student, a joy stick operable by the instructor, transmission connections secured to the joy stick and to its axis of rotation, guide pulleys secured to the walls of the cabin, pulley shafts controlled by said transmission connections and effecting variations in the indications given by the instruments on the board, and return springs for said transmission connections.

In testimony whereof I affix my signature.

LUCIEN ROUGERIE.